US009411885B2

(12) United States Patent
Yokoyama et al.

(10) Patent No.: US 9,411,885 B2
(45) Date of Patent: Aug. 9, 2016

(54) ELECTRONIC APPARATUS AND METHOD FOR PROCESSING DOCUMENTS

(71) Applicant: KABUSHIKI KAISHA TOSHIBA, Minato-ku, Tokyo (JP)

(72) Inventors: Sachie Yokoyama, Ome (JP); Eita Shuto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 14/151,580

(22) Filed: Jan. 9, 2014

(65) Prior Publication Data

US 2015/0026560 A1 Jan. 22, 2015

(30) Foreign Application Priority Data

Jul. 22, 2013 (JP) .................................. 2013-152073

(51) Int. Cl.
*G06F 17/21* (2006.01)
*G06F 17/30* (2006.01)

(52) U.S. Cl.
CPC .... *G06F 17/30861* (2013.01); *G06F 17/30011* (2013.01); *G06F 17/30716* (2013.01); *G06F 17/30722* (2013.01)

(58) Field of Classification Search
CPC .......................... G06F 3/04842; G06F 17/3089
See application file for complete search history.

(56) References Cited

U.S. PATENT DOCUMENTS

| | | | | |
|---|---|---|---|---|
| 6,122,647 A * | 9/2000 | Horowitz | .......... | G06F 17/30873 707/999.003 |
| 6,219,679 B1 * | 4/2001 | Brisebois | .......... | G06F 17/30855 707/E17.013 |
| 7,085,994 B2 * | 8/2006 | Gvily | .................. | G06F 17/3089 707/E17.116 |
| 8,306,977 B1 * | 11/2012 | Gildfind | .............. | G06F 17/3064 707/734 |
| 8,666,961 B1 * | 3/2014 | Qureshi | ............ | G06F 17/30312 707/705 |
| 8,983,950 B2 * | 3/2015 | Askey | ............... | G06F 17/30761 707/734 |
| 9,224,150 B2 * | 12/2015 | Black | ...................... | G06Q 10/10 |
| 2004/0019611 A1 * | 1/2004 | Pearse | ............... | G06F 17/30887 |
| 2006/0041589 A1 * | 2/2006 | Helfman | .............. | G06F 17/3089 |
| 2008/0059451 A1 * | 3/2008 | Musgrove | ......... | G06F 17/30864 |
| 2008/0140679 A1 * | 6/2008 | Deyo | .................. | G06F 17/30867 |
| 2008/0141136 A1 * | 6/2008 | Ozzie | ...................... | G08B 21/22 715/723 |
| 2008/0154886 A1 * | 6/2008 | Podowski | ......... | G06F 17/30646 |
| 2008/0208872 A1 * | 8/2008 | Gavalda | ................ | G11B 27/10 |
| 2009/0100032 A1 * | 4/2009 | Jones | ................ | G06F 17/30867 |

(Continued)

FOREIGN PATENT DOCUMENTS

JP 2008-226202 A 9/2008

OTHER PUBLICATIONS

Evernote Web Clipper, Apr. 17, 2012, pp. 1-15 https://blog.evernote.com/blog/2012/04/17/evernote-web-clipper-for-chrome-now-with-smart-filing-and-clipping-to-shared-notebooks/.*

*Primary Examiner* — Scott Baderman
*Assistant Examiner* — Mario M Velez-Lopez
(74) *Attorney, Agent, or Firm* — Knobbe, Martens, Olson & Bear LLP

(57) ABSTRACT

According to one embodiment, an electronic apparatus includes a processor and a display processor. The processor stores a plurality of clip data items in storage, each of the plurality of clip data items including a clip and one or more tags associated with the clip, the clip corresponding to at least a part of a document. The display processor displays one or more first tags on a screen if a first clip is selected from a first document displayed on the screen, the first clip corresponding to at least a part of the first document, wherein the one or more first tags are related to the first clip and extracted from the plurality of clip data items.

9 Claims, 7 Drawing Sheets

(56) References Cited

U.S. PATENT DOCUMENTS

| | | | |
|---|---|---|---|
| 2009/0125934 A1* | 5/2009 | Jones | H04N 7/163 725/28 |
| 2009/0282337 A1* | 11/2009 | Tilley | G06F 17/30781 715/719 |
| 2010/0131895 A1* | 5/2010 | Wohlert | H04L 65/604 715/811 |
| 2011/0302162 A1* | 12/2011 | Xiao | G06F 17/30867 707/724 |
| 2012/0239661 A1* | 9/2012 | Giblin | G06F 17/30817 707/741 |
| 2013/0117161 A1* | 5/2013 | Waidmann | G06Q 30/06 705/27.1 |
| 2013/0325870 A1* | 12/2013 | Rouse | G06F 17/30707 707/741 |

* cited by examiner

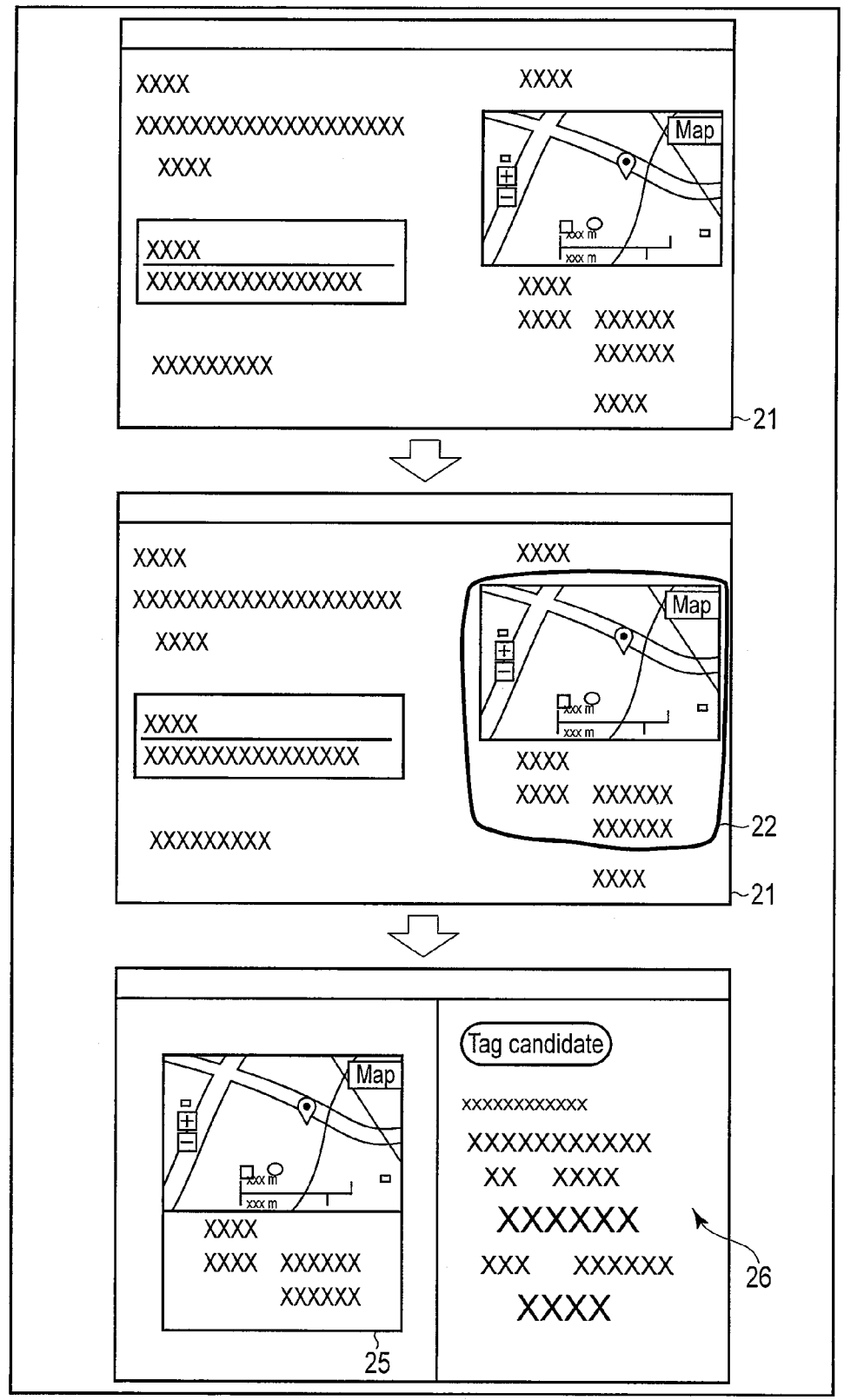
F I G. 3

| Clip ID | Document | Clip area | Tag 1 | ... | Keyword 1 | ... | ... |
|---------|----------|-----------|-------|-----|-----------|-----|-----|
| ... | ... | ... | ... | ... | ... | ... | ... |
| ... | ... | ... | ... | ... | ... | ... | ... |
| ⋮ | ⋮ | ⋮ | ⋮ | ⋮ | ⋮ | ⋮ | ⋮ |

FIG. 5

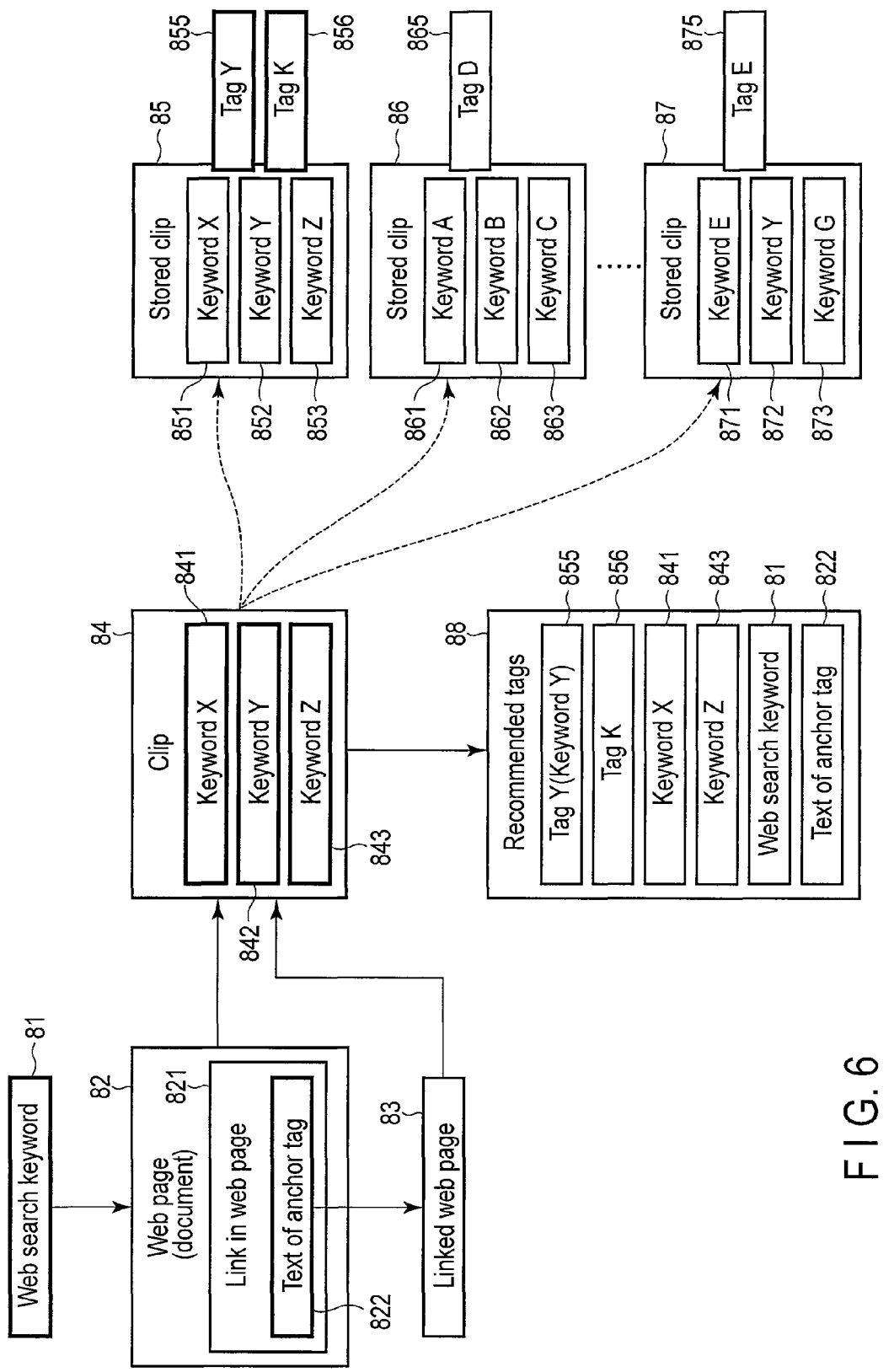
F I G. 6

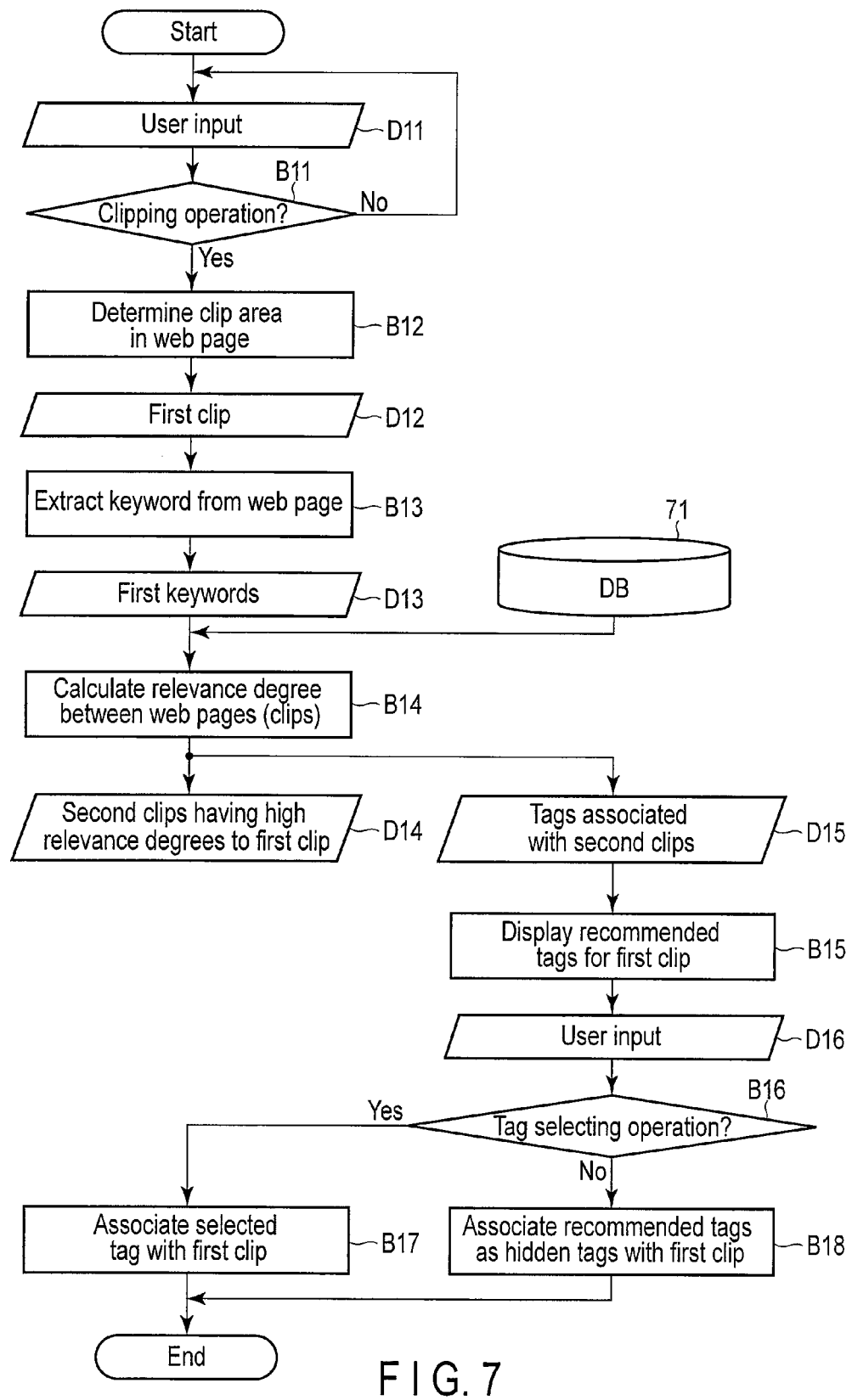
F I G. 7

ELECTRONIC APPARATUS AND METHOD FOR PROCESSING DOCUMENTS

CROSS-REFERENCE TO RELATED APPLICATIONS

This application is based upon and claims the benefit of priority from Japanese Patent Application No. 2013-152073, filed Jul. 22, 2013, the entire contents of which are incorporated herein by reference.

FIELD

Embodiments described herein relate generally to an electronic apparatus for processing documents, and a method applied to the electronic apparatus.

BACKGROUND

Various application programs used to store parts of documents, such as web pages, as clips have recently been developed. Such application programs have a function of storing parts of documents as clips in a storing device, a server, etc., the parts of documents being selected using, for example, a pointing device, such as a touch screen display. Therefore, users can store, as clips, the parts of displayed documents that they are curious about or wish to utilize later.

However, when a large number of clips are accumulated, it may be difficult to find out a desired clip in the clips. In view of this, there may be a case where tags associated with the content should be attached to the clips in order to efficiently detect the desired clip.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary view for explaining a screen transition for tagging a clip extracted from a document by the electronic apparatus of the embodiment.

FIG. 5 is a view of illustrating a structure example of clip data used in the electronic apparatus of the embodiment.

FIG. 6 is a view for explaining a determination of a recommended tag (or tags) by the electronic apparatus of the embodiment.

FIG. 7 is an exemplary flowchart of the procedure of a tagging process executed by the electronic apparatus of the embodiment.

DETAILED DESCRIPTION

Various embodiments will be described hereinafter with reference to the accompanying drawings.

In general, according to one embodiment, an electronic apparatus includes a processor and a display processor. The processor is configured to store a plurality of clip data items in storage, each of the plurality of clip data items including a clip and one or more tags associated with the clip, the clip corresponding to at least a part of a document. The display processor is configured to display one or more first tags on a screen if a first clip is selected from a first document displayed on the screen, the first clip corresponding to at least a part of the first document, wherein the one or more first tags are related to the first clip and extracted from the plurality of clip data items.

Figure 1:
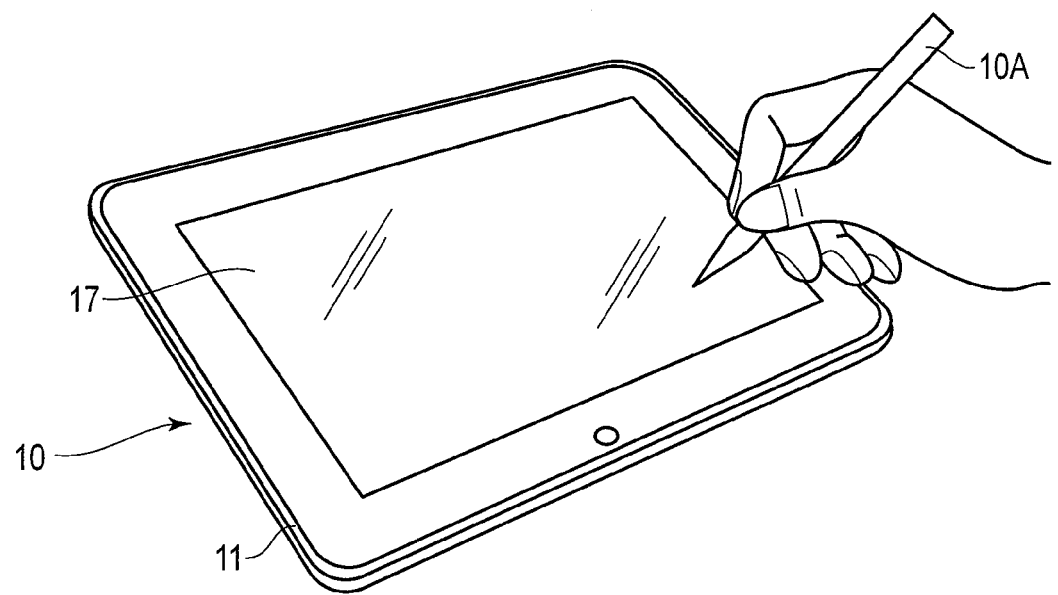
FIG. 1 is an exemplary perspective view of the appearance of an electronic apparatus according to an embodiment.

FIG. 1 is a perspective view of the appearance of an electronic apparatus according to an embodiment. This electronic apparatus is a mobile electronic apparatus in which handwriting input using, for example, a pen or finger is enabled. This electronic apparatus can be realized as a tablet computer, a notebook personal computer, a smartphone, a PDA, etc. In the description below, the electronic apparatus is realized as a tablet computer 10. The tablet computer 10 is a mobile electronic apparatus also called a tablet or a slate computer. As shown in FIG. 1, the tablet computer 10 includes a main unit 11 and a touch screen display 17. The touch screen display 17 is attached to the main unit 11, superposed on the upper surface of the main unit 11.

The main unit 11 has a thin box-shaped housing. The touch screen display 17 incorporates a flat panel display, and a sensor configured to detect the contact position of a pen or finger on the screen of the flat panel display. The flat panel display may be, for example, a liquid crystal display (LCD). As the sensor, a capacitance type touch panel, an electromagnetic induction type digitizer, etc., can be used. In the description below, it is supposed that the touch screen display 17 incorporates two types of sensors, i.e., the digitizer and the touch panel.

The digitizer and the touch panel are each superposed on the screen of the flat panel display. The touch screen display 17 can detect not only a touch operation on the screen using a finger, but also a touch operation on the screen using a pen 10A. The pen 10A may be, for example, an electromagnetic induction pen. Using the pen 10a or finger, the user of the tablet computer 10 can perform various gesture operations, such as tapping, dragging, swiping, clicking, etc.

Further, the user can perform a handwriting input operation on the touch screen display 17 using the pen 10A. During the handwriting input operation, the locus of the movement of the pen 10A on the screen, i.e., the stroke of handwriting, is drawn in real time, whereby a plurality of handwriting strokes (the loci of the handwriting strokes) are displayed on the screen.

Figure 2:
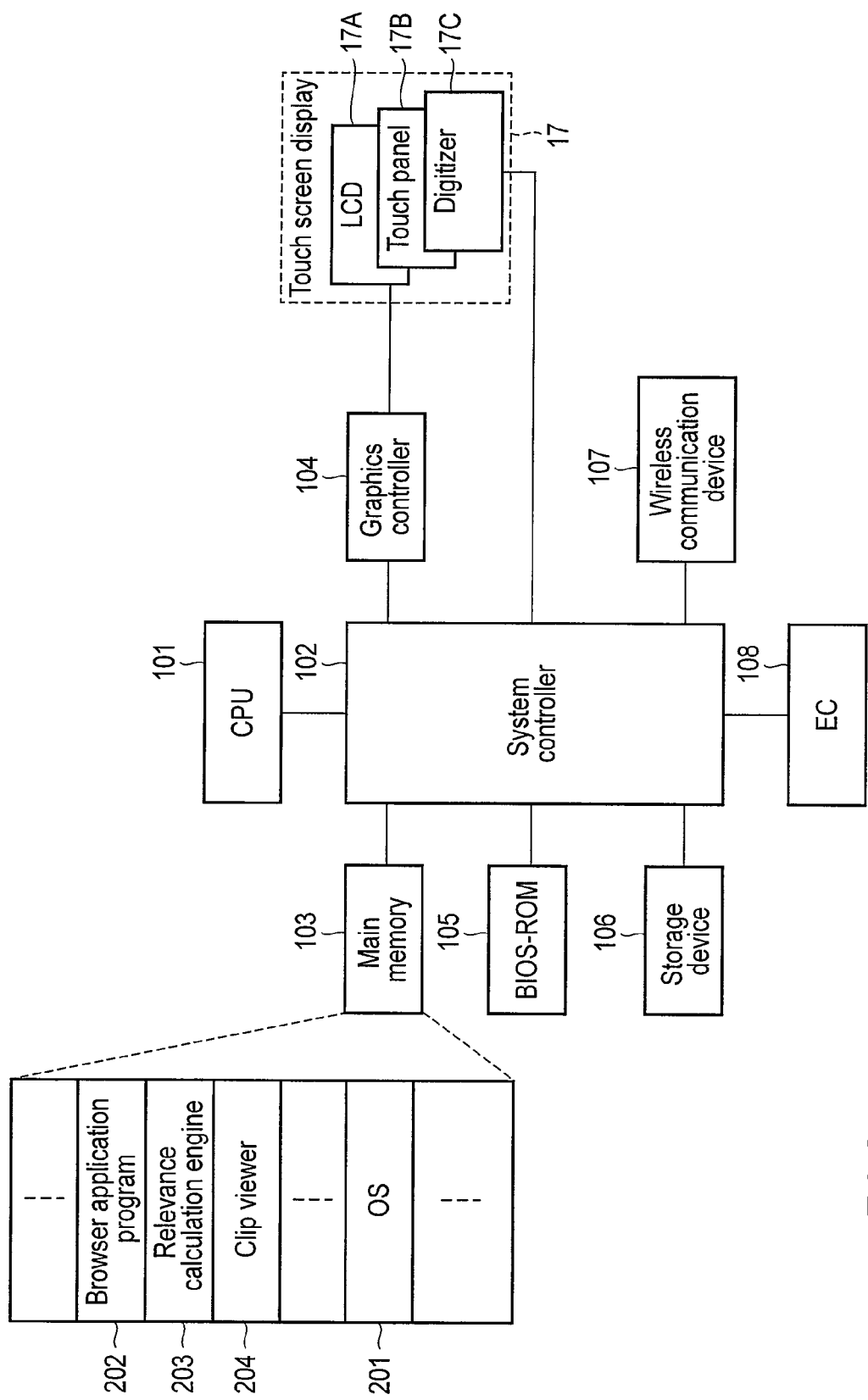
FIG. 2 is an exemplary block diagram showing the system configuration of the electronic apparatus of the embodiment.

FIG. 2 is a block diagram showing the system configuration of the tablet computer 10 according to the embodiment.

As shown in FIG. 2, the tablet computer 10 includes a CPU 101, a system controller 102, a main memory 103, a graphics controller 104, a BIOS-ROM 105, a storage device 106, a wireless communication device 107, an embedded controller (EC) 108, etc.

The CPU 101 is a processor configured to control various components incorporated in the tablet computer 10. The CPU 101 executes various programs loaded from the storage device 106 to the main memory 103. The programs executed by the CPU 101 include various application programs, such as an operating system (OS) 201, a browser application program 202, a relevance calculation engine 203, and a clip viewer 204. The browser application program 202 has a function of receiving web-page data from a web server, a function of displaying a web page on the screen, and a function of storing a part of the web page as a clip. The relevance calculation engine 203 has a function of calculating a relevance degree between documents (e.g., between web pages) based on the text contained in the documents. The clip viewer 204 has a function of browsing the stored clips.

The CPU 101 also executes a basic input output system (BIOS) stored in the BIOS-ROM 105. The BIOS is a program for hardware control.

The system controller 102 is a device configured to connect the local bus of the CPU 101 and respective components. The system controller 102 contains a memory controller configured to control access to the main memory 103, and has a function of communicating with the graphics controller 104 via, for example, a serial bus.

The graphics controller 104 is a display controller configured to control an LCD 17A used as the display monitor of the tablet computer 10. The display signal generated by the graphics controller 104 is sent to the LCD 17A. The LCD 17A displays a screen image based on the display signal. A touch panel 17B configured to detect the touch position of a finger on the screen is provided on the upper surface of the LCD 17A. Further, a digitizer 17C configured to detect the touch position of the pen 10A on the screen is provided on the lower surface of the LCD 17A. The touch panel 17B is a capacitance type pointing device used to permit input operations on the screen of the LCD 17A. The touch panel 17B detects, for example, the touch position of a finger on the screen, and a motion of the touch position. The digitizer 17C is an electromagnetic induction type pointing device configured to permit input operations on the screen of the LCD 17A. The digitizer 17C detects, for example, the touch position of the pen 10A on the screen, and a motion of the touch position.

The OS 201 cooperates with a driver program, configured to control the touch panel 17B, to issue an input event indicating that a finger has touched the screen, and indicating the touch position of the finger. The OS 201 also cooperates with a driver program, configured to control the digitizer 17C, to issue an input event indicating that the pen 10A has touched the screen, and indicating the touch position of the pen 10A.

The wireless communication device 107 is configured to execute wireless communication, such as wireless LAN communication or 3G mobile communication.

The EC 108 is a one-chip microcomputer including an embedded controller for power management, and has a function of turning on and off the tablet computer 10 in accordance with operation of a power button by the user.

As described above, the browser application program 202 has a clip function of storing an arbitrary part of a document as a clip, in addition to the browsing function of displaying the document (web page). By virtue of the clip function, the user can store, as a clip during browsing a document, the part of the document that they are curious about or wish to utilize later.

However, if a large number of clips have been accumulated, it may become difficult to find out a desired clip in the clips. In view of this, in the embodiment, tag candidates for a clip, which is to be stored, are presented to the user in order for the user to easily attach, to the clip, a tag related to its description.

In this embodiment, the document may include at least a sentence, an image, a table, or a figure. For instance, the document is a web page. Similarly, the clip may include at least a sentence, an image, a table or a figure that corresponds to a part of a document. More specifically, "clip" may include all information in the part of the document, or may include only a part of the information.

FIG. 3 is an example of a screen sequence of extracting a clip from a currently displayed document (e.g., a web page) and attaching a tag to the clip.

Suppose here that a web page 21 containing text and image is displayed on the screen. The user can display a desired web page 21 on the screen by activating, for example, the browser application program 202 and performing so-called net surfing.

Also, suppose that during browsing the web page 21, the user has detected a part of the web page 21, which the user is curious about or wishes to utilize later, and therefore wishes to store. At this time, the user performs a clip operation to designate a clipping area 22 in the currently displayed web page 21, using such a pointing device as the touch screen display 17. In the embodiment, a clip 25 corresponding to at least a part of the web page 21 is extracted based on the clipping area 22.

In accordance with the clip operation, the extracted clip 25 and tag candidates (hereinafter, also referred to as "recommended tags") 26 are displayed. If the user has selected one of the tag candidates 26 by, for example, tapping the tag candidate, the selected tag is associated with the clip 25.

Thus, the user does not have to perform an operation of displaying a menu screen for tagging the clip 25, an operation of selecting a text box for inputting therein a tag in the menu screen, and an operation of inputting characters corresponding to the tag in the text box, using a keyboard, thereby diminishing the works required for tagging the clip 25.

The tag associated with a clip may be any type of word (e.g., a keyword). The tag may be such a word as indicating the description of the clip, or indicating the position and/or the purpose of use of the clip to the user. Alternatively, the user may arbitrarily select a useful word as the tag.

Figure 4:
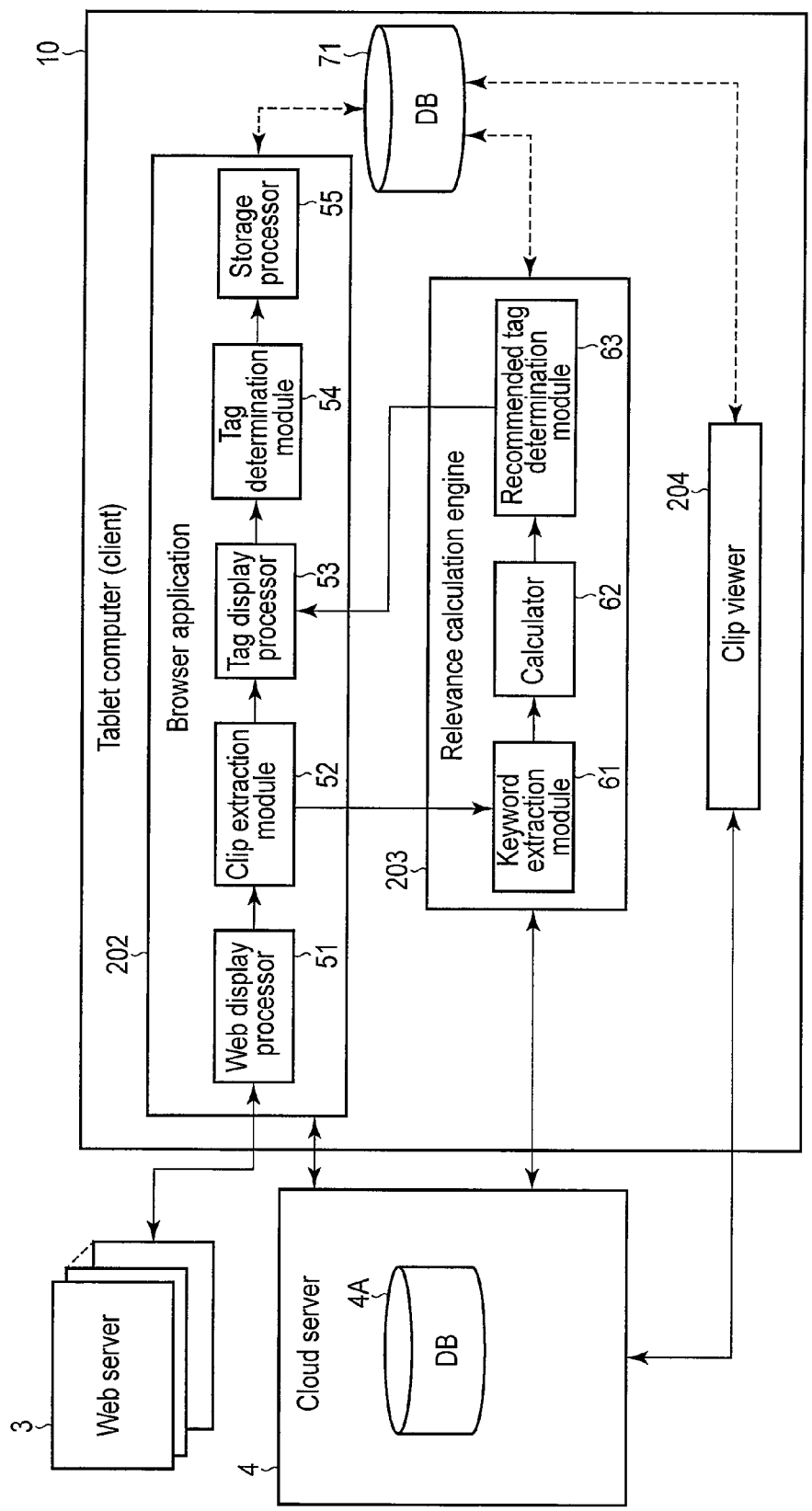
FIG. 4 is an exemplary block diagram showing the functional structure of a program executed by the electronic apparatus of the embodiment.

FIG. 4 shows the functional structure of the tablet computer 10. On the tablet computer 10, the browser application program 202, the relevance calculation engine 203 and the clip viewer 204 may be executed.

Firstly, the browser application program 202 will be described. The browser application program 202 includes a web display processor 51, a clip extraction module 52, a tag display processor 53, a tag determination module 54, and a storage processor 55.

The web display processor 51 receives data of a web page (document) from a web server 3, and displays a web page 21 on the screen of the LCD 17A based on the received data. More specifically, the web display processor 51 receives, for example, an HTML file corresponding to a URL designated by the user from the web server 3. After that, the web display processor 51 displays the corresponding web page 21 by analyzing the received HTML file.

The clip extraction module 52 selects a first clip 25, corresponding at least to a part of the web page 21, from the web page 21 displayed on the screen in accordance with a user's clipping operation. The clip operation is an operation of designating acquisition of an arbitrary area 22 on the web page 21, using a pointing device such as the touch panel 17B or the digitizer 17C. The area 22 is designated by, for example, coordinate information indicating handwriting strokes made by the pointing device. The clip extraction module 52 extracts, as a first clip 25, a text and/or an image structuralized on the web page 21 and corresponding to the area 22 designated by the clip operation. More specifically, the clip extraction module 52 extracts, for example, source codes corresponding to the area 22 designated by the clip operation, from HTML source codes corresponding to the web page 21.

Further, the clip extraction module 52 outputs the currently displayed web page (HTML file) 21 to the relevance calculation engine 203. The relevance calculation engine 203 outputs recommended tags 26 for the first clip 25, which are determined using the web page 21, to the browser application program 202 (tag display processor 53). The recommended tags 26 includes one or more tags related to the first clip 25 which are extracted from one or more tags associated with each of clips already stored in a DB 71.

The tag display processor 53 displays, on the screen, the first clip 25 and the recommended tags 26 output by the relevance calculation engine 203. The relevance calculation engine 203 also can output the recommended tags 26, with relevance degrees between the tags 26 and the first clip 25 attached. In this case, the tag display processor 53 may set, for each recommended tag 26, the position at which this tag is displayed, the size and color thereof, etc., in order for the user to easily select the tags.

The tag determination module 54 determines a tag (or tags) of the displayed recommended tags 26 for the first clip 25. Namely, if the user has selected a certain tag (first tag), the tag determination module 54 determines the tag as a tag associated with the first clip 25. In contrast, if the user has selected no tag from the recommended tags 26, the tag determination module 54 may determine all the recommended tags 26 as tags (hidden tags) associated with the first clip.

The storage processor 55 stores clip data including the first clip 25 and the determined tag in the DB 71 (or a DB 4A). For instance, a memory area in the storage device 106 may be used as the DB 71. Thus, the storage processor 55 stores, in a storage device (e.g., the storage device 106), a plurality of clip data items each including a clip corresponding to at least a part of a document (web page) and one or more tags associated with this clip, in accordance with a user's clipping operation. The storage processor 55 can also store, in the DB 71, clip data further including other data related to the first clip 25, as will be described later with reference to FIG. 5.

The relevance calculation engine 203 will now be described. The relevance calculation engine 203 includes a keyword extraction module 61, a calculator 62 and a recommended tag determination module 63.

The keyword extraction module 61 analyzes the web page (HTML file) 21 output from the browser application program 202, thereby extracting keywords from the web page 21. More specifically, the keyword extraction module 61 subjects an HTML source code corresponding to the web page 21 to a document object model (DOM) analysis, thereby extracting text data (e.g., title, sentence, etc.) that excludes the HTML tag, etc. The keyword extraction module 61 performs morphological analysis on the extracted text data, thereby separates the text data into words (morphemes), and determines the part of speech of each word using a dictionary. After that, the keyword extraction module 61 extracts a characteristic word on the web page 21 as a keyword for the web page 21 from the words detected by the morphological analysis.

The keyword extraction module 61 extracts, for example, a noun as a keyword from the words detected by the morphological analysis. Alternatively, the keyword extraction module 61 may extract a proper noun or a parenthesized word as the keyword. Yet alternatively, the keyword extraction module 61 may extract a keyword from the words detected by the morphological analysis, in accordance with a preset rule. This rule defines, for example, that a word (e.g., "title") used in common between various documents (web pages) should not be extracted as a keyword, or that a word appearing in the beginning portion of a document should preferentially be extracted as the keyword.

The calculator 62 calculates the relevance degree between the extracted first clip 25 and each of stored clips (each history data item concerning clips). For instance, the calculator 62 utilizes, as the relevance degrees between clips, the relevance degrees between the currently displayed web page 21 and the web pages from which the clips stored in the DB 71 or the DB 4A in a cloud server 4 were extracted.

More specifically, firstly, the calculator 62 reads clip data corresponding to each clip from the DB 71. Alternatively, the calculator 62 may read clip data from the DB 4A of the cloud server 4 via a network.

Figure 5:
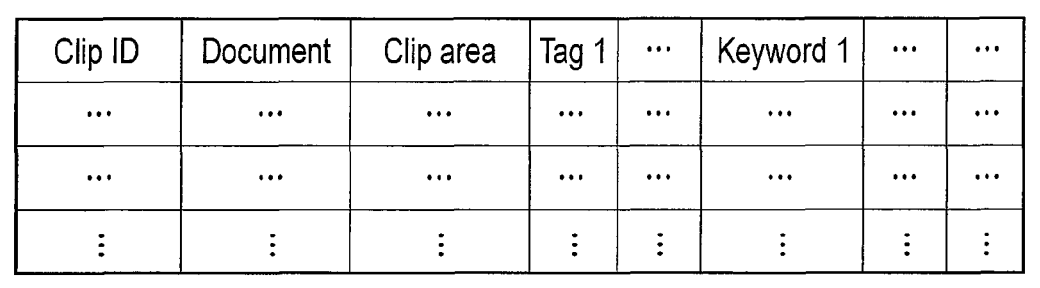

FIG. 5 shows a configuration example of clip data stored in the DB 71 or the DB 4A of the cloud server 4. As shown, the clip data includes a plurality of entries corresponding to a plurality of clips. Each entry includes a clip ID, a document, a clipping area, a tag (tags) and a keyword (keywords).

In the entry corresponding to a certain clip, "Clip ID" indicates identification information assigned to the clip. "Document" indicates a source document from which the clip was extracted. Various types of documents, such as web pages, that contain text and still image and video are each used as the "Document". For instance, in the entry "Document", the description of a file (e.g., an HTML source code in an HTML file) corresponding to the web page as the source page of a clip is set.

The "Clipping area" indicates the area on a document that corresponds to the clip. For instance, if the clip is extracted from a web page based on an HTML file, in the entry "Clipping area", the HTML source code (or the area of the HTML source code) in the HTML file that corresponds to the clip is set.

The "Tag" indicates the tag associated with the clip. In one entry, a plurality of "Tags" can be included. Namely, one clip can be associated with a plurality of tags.

The "Keyword" indicates a keyword contained in the document as the source document of the clip. If one document contains a plurality of keywords, a plurality of "Keywords" are included in one entry. As the "Keyword(s)", a keyword (keywords) extracted from the document by, for example, the above-mentioned keyword extraction module 61 is set.

The calculator 62 calculates the relevance degree between the clip 25 and each of the clips stored in the DB 71 (or DB 4A), using one or more first keywords in the currently displayed web page 21, and one or more second keywords in the clip data corresponding to the already stored clips (i.e., one or more second keywords corresponding to the stored clips). In other words, the calculator 62 calculates the relevance degree between the currently displayed web page 21 and each of the web pages as the source pages of the stored clips, using the one or more first keywords and the one or more second keywords. The relevance degree is higher if the first and second keywords contain a larger number of common keywords. If there is no common keyword, the relevance degree is, for example, 0. Namely, the calculator 62 calculates the relevance degree between clips (i.e., between web pages) based on the co-occurrence degree of keywords.

The calculator 62 can calculate the relevance degrees between clips, not only using the co-occurrence degree of keywords, but also using various features in format or meaning, such as the times and dates of the generation of the clips, the times and dates at which the web pages were accessed to extract the clips therefrom, the document types of the web pages, and the fields to which the clips belong. For example, the calculator 62 may calculate the relevance degrees, using clip data of the clips that are already stored in the DB 71 (or DB 4A) and were generated within a preset period (e.g., in the same time period).

The recommended tag determination module 63 extracts one or more tags related to the first clip 25 from one or more tags contained in a plurality of clip data items stored in the DB 71 (or DB 4A), and determines these extracted tags as recommended tags 26. Namely, the recommended tag determination module 63 extracts, as the recommended tags 26, the tags estimated to be relevant to the first clip 25 from the tags associated with the clips stored in the DB 71.

More specifically, the recommended tag determination module 63 determines a stored clip (second clip) related to the first clip 25, based on the relevance degrees calculated by the calculator 62. For instance, the recommended tag determination module 63 determines that the stored clips having, for example, relevance degrees that are equal to or higher than a threshold are relevant clips. Subsequently, the recommended tag determination module 63 determines, as the recommended tags 26, one or more tags associated with the stored clips, using clip data (second clip data) corresponding to the relevant clips already stored. The recommended tag determination module 63 may determine, as the recommended tags 26, a keyword extracted from the currently displayed web page 21.

The recommended tag determination module 63 outputs the determined recommended tags 26 to the browser application program 202 (tag display processor 53).

As described above, the tag display processor 53 of the browser application program 202 displays the first clip 25 and one or more recommended tags 26 on the screen. Namely, if acquisition of the first clip 25 corresponding to at least a part of the web page 21 (document) displayed on the screen is selected, the tag display processor 53 displays, on the screen, one or more recommended tags 26 which are related to the first clip 25 and extracted from clip data items. If a first tag is selected from the currently displayed recommended tags 26, the storage processor 55 stores, in the DB 71 (or the DB 4A), clip data including the first clip 25, the first tag, and the keywords extracted from the currently displayed web page (first document) 21. In contrast, if no tag is selected from the currently displayed recommended tags 26 (if, for example, browsing of another web page has been requested instead of selecting a tag), the storage processor 55 stores, in the DB 71 (or the DB 4A), clip data including the first clip 25, the recommended tags 26, and the keywords. The clip data to be stored may further include the web page 21 from which the first clip 25 was extracted.

As described above, since in the embodiment, the user does not have to use a keyboard when attaching a tag to the clip 25, the user can easily perform such an attachment. Further, since the recommended tags 26 are displayed utilizing the tags associated with the clips already stored in the DB 71, fluctuations of the wording of the tag associated with the clip 25 can be suppressed, compared to the case where the user directly inputs the tag using the keyboard. Suppression of fluctuations of the wording can realize efficient searching of clips based on the tags.

The clip viewer 204 has a function for enabling browsing of stored clips, using clip data stored in the DB 71 (or the DB 4A). The clip viewer 204 can search clips by, for example, a search keyword input by the user, and then display, as a search result, a clip (clips) with which the search keyword is associated as a tag. Thus, the user can efficiently search for a clip they want to browse, utilizing the tag.

Further, as described above, even when the user has selected no tags from the displayed recommended tags 26, clip data including the clip 25, the recommended tags 26 and the keyword extracted from the web page 21 is stored in the DB 71 (or the DB 4A). Accordingly, even when the user did not perform a tag attaching operation, they can easily search the clips in the DB 71, using the recommended tags automatically associated thereto.

Referring then to FIG. 6, a description will be given of a specific example of generating recommended tags for a clip.

The web display processor 51 displays, on the screen of the LCD 17A, a list of web pages relative to, for example, a web search keyword 81, using a web search result based on the web search keyword 81. At this time, if the user has performed an operation of selecting a web page 82 from the web page list (i.e., an operation of selecting a link to the web page 82), the web display processor 51 receives data of the web page 82 from the web server 3 and then displays the web page 82 on the screen.

The user may perform an operation of selecting a link 821 in the displayed web page 82. For instance, on the web page 82, text 822 set in an anchor tag in HTML source codes is displayed as a selectable link 821. If the user has performed an operation of selecting the link 821, the web display processor 51 receives data of a linked web page 83 from the web server 3 and then displays the web page 83 on the screen.

Subsequently, if the user has performed an operation of designating an arbitrary area in the displayed web page 82 or 83 (first document), the clip extraction module 52 extracts a clip 84 (first clip) corresponding to the area from the web page 82 or 83. The clip extraction module 52 then outputs the web page 82 or 83 as the source page of the clip 84 to the relevance calculation engine 203.

By analyzing the received the web page 82 or 83, the keyword extraction module 61 of the relevance calculation engine 203 extracts "Keyword X" 841, "Keyword Y" 842 and "Keyword Z" 843 from the web page 82 or 83.

Subsequently, the calculator 62 reads clip data corresponding to already stored clips 85, 86 and 87 from the DB 71. For instance, the calculator 62 reads keywords and tags corresponding to the clips 85, 86 and 87 from the DB 71. After that, the calculator 62 calculates the relevance degree between the clips, using keywords 841, 842 and 843 (i.e., the keywords corresponding to the clip 84) extracted by the keyword extraction module 61, and the keywords corresponding to the stored clips 85, 86 and 87.

In the example shown in FIG. 6, "Keyword X" 841, "Keyword Y" 842 and "Keyword Z" 843 corresponding to the extracted clip 84 coincide with "Keyword X" 851, "Keyword Y" 852 and "Keyword Z" 853 corresponding to a stored clip 85, respectively. Therefore, the calculator 62 computes the relevance degree between the clips 84 and 85 at a high value. For instance, the calculator 62 computes the relevance degree between the clips 84 and 85 at 1, assuming that the relevance degree ranges from 0 to 1, 1 indicating the highest relevance degree.

Further, "Keyword X" 841, "Keyword Y" 842 and "Keyword Z" 843 corresponding to the extracted clip 84 coincide with none of "Keyword A" 861, "Keyword B" 862 and "Keyword C" 863 corresponding to a stored clip 86. In this case, the calculator 62 computes the relevance degree between the clips 84 and 86 at a low value (e.g., 0).

Yet further, in the case of a stored clip 87, only "Keyword Y" 872 in the three keywords corresponding to the clip 87, i.e., Keyword E" 871, "Keyword Y" 872 and "Keyword G" 873, coincides with "Keyword Y" 842 in the three keywords corresponding to the extracted clip 84, i.e., "Keyword X" 841, "Keyword Y" 842 and "Keyword Z" 843. In this case, the calculator 62 computes the relevance degree between the clips 84 and 87 at an intermediate value (e.g., 0.3).

Based on the relevance degree between the clip 84 and each of the stored clips, the recommended tag determination module 63 determines recommended tags 88 for the clip 84. For instance, the recommended tag determination module 63 determines, as the recommended tags 88, the tags associated with stored clips having relevance degrees, for example, not lower than a threshold. In the example of FIG. 6, if the threshold is 0.5, the recommended tag determination module 63 determines, as the recommended tags 88, "Tag Y" 855 and "Tag K" 856 associated with the stored clip 85 having a relevance degree of 1. The tags associated with the stored clips 85, 86 and 87 may be those selected from the recommended tags by the recommended tag determination module 63 when each of the clips 85, 86 and 87 is stored, or may be those determined by another method, e.g., the tags input by the user using a keyboard.

Alternatively, the recommended tag determination module 63 may determine, as the recommended tags 88, "Keyword X" 841, "Keyword Y" 842 and "Keyword Z" 843 corresponding to the extracted clip 84, the web search keyword 81 and the text 822 of the anchor tag. The recommended tag determination module 63 outputs the determined recommended tags 88 to the browser application program 202.

The tag display processor 53 of the browser application program 202 displays the received recommended tags 88 on the screen.

Referring then to the flowchart of FIG. 7, a description will be given of a procedure of tagging a clip. In the description below, it is supposed that a web page (document) is displayed on the screen.

Firstly, the clip extraction module 52 determines whether a user input D11 is a clipping operation on the currently displayed web page (block B11). If the user input D11 is not a clipping operation (No in block B11), it is again determined whether a subsequent user input D11 is a clipping operation.

If the user input D11 is a clipping operation (Yes in block B11), the clip extraction module 52 determines a clipping area in the currently displayed web page, based on the area designated by the clipping operation, and extracts a first clip D12 corresponding to the clipping area (block B12).

The keyword extraction module 61 extracts keywords D13 from the currently displayed web page (block B13). Subsequently, the calculator 62 reads, from the DB 71, second keywords corresponding to the stored clips (keywords contained in the web pages as the source pages from which the stored clips were extracted), and calculates the relevance degree between the currently displayed web page and each of the web pages corresponding to the stored clips (i.e., the relevance degree between the first clip D12 and each of the stored clips), using first keywords D13 and second keywords (block B14). Based on the thus-calculated relevance degrees, second clips D14 having high relevance degrees to the first clip D12 (i.e., the stored clips having high relevance degrees to the first clip D12) are determined, and tags D15 associated with the second clips D14 are acquired from the DB 71.

Subsequently, the tag display processor 53 displays recommended tags for the first clip D12, using the first keywords D13 and the tags D15 (block B15). The tag determination module 54 determines whether a user input D16 is a tag selection operation for selecting a tag to be associated with the first clip D12 from the displayed recommended tags (block B16). If the user input D16 is the tag selection operation (Yes in block B16), the tag determination module 54 determines that the selected tag should be associated with the first clip D12, and the storage processor 55 stores the associated first clip D12 and tag in the DB 71 (block B17). In contrast, if the user input D16 is not the tag selection operation, namely, if the tag to be associated with the first clip D12 has not been selected (No in block B16), the tag determination module 54 determines that the recommended tags should be hidden tags to be associated with the first clip D12, and the storage processor 55 stores the associated first clip D12 and recommended tags in the DB 71 (block B18).

As described above, in the embodiment, tagging a clip extracted from a document can be assisted. The storage processor 55 stores, in the DB 71 (or the DB 4A), a plurality of clip data items each including a clip corresponding to at least a part of the document, and one or more tags associated with the clip. When the first clip 25 corresponding to a part of the first document 21 displayed on the screen has been selected, the tag display processor 53 displays, on the screen, one or more recommended tags that are included in the one or more tags contained in each of clip data items and correspond to the first clip 25.

The user can easily select, from the one or more recommended tags displayed, a tag that they want to associate with the first clip 25. Thus, the embodiment can assist tagging the clip extracted from a document.

The above-mentioned procedure of tagging processing in the embodiment can be entirely executed by software. Accordingly, the same advantage as that of the embodiment can be easily obtained simply by installing a program for executing the procedure of the tagging processing into a standard computer through a computer-readable storage medium that stores the program, and executing the program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising: a memory that stores first clip data comprising a first clip and a first tag, and second clip data comprising a second clip and a second tag, wherein the first clip is a part of a first document, the first tag is associated with the first clip, the second clip is a part of a second document, and the second tag is associated with the second clip a display; and a hardware processor configured to:

display a third document on a screen of the display;

receive a selection of a part of the third document as a third clip according to a user operation;

determine a first candidate tag and a second candidate tag associated with the third clip; display the first candidate tag in a first form and the second candidate tag in a second form different from the first form on the screen, if the first candidate tag is same as the first tag or the second tag and if the second candidate tag is not same as the first tag and the second tag, wherein the first candidate tag and the second candidate tag have different sizes or colors;

store third clip data comprising the third clip and the first candidate tag, if the first candidate tag is selected; and store third clip data comprising the third clip and the second candidate tag, if the second candidate tag is selected;

wherein the hardware processor is configured to display the first candidate tag in a first size or a first color and the second candidate tag in a second size or a second color if a first relevance between the first clip and the third clip is larger than a second relevance between the second clip and the third clip, and to display the first candidate tag in the second size or the second color and the second candidate tag in the first size or the first color if the first relevance is not larger than the second relevance, the first candidate tag is same as the first tag, and the second candidate tag is same as the second tag.

2. The electronic apparatus of claim 1, wherein the hardware processor is configured to determine the first candidate tag and the second candidate tag by using one or more keywords corresponding to the first clip, one or more keywords corresponding to the second clip and one or more keywords corresponding to the third clip.

3. The electronic apparatus of claim 1, wherein the hardware processor is configured to store third clip data comprising the third clip, the first candidate tag and the second candidate tag, if the first candidate tag and the second candidate tag are not selected.

4. A method comprising:
   storing first clip data comprising a first clip and a first tag, and second clip data comprising a second clip and a second tag, in a memory, wherein the first clip is a part of a first document, the first tag is associated with the first clip, the second clip is a part of a second document, and the second tag is associated with the second clip
displaying a third document on a screen of a display;
receiving a selection of a part of the third document as a third clip according to a user operation; determining a first candidate tag and a second candidate tag associated with the third clip; displaying the first candidate tag in a first form and the second candidate tag in a second form different from the first form on the screen, if the first candidate tag is same as the first tag or the second tag and if the second candidate tag is not same as the first tag and the second tag, wherein the first candidate tag and the second candidate tag have different sizes or colors;
   storing third clip data comprising the third clip and the first candidate tag, if the first candidate tag is selected; and
   storing third clip data comprising the third clip and the second candidate tag, if the second candidate tag is selected;
   wherein displaying the first candidate tag and the second candidate tag comprises displaying the first candidate tag in a first size or a first color and the second candidate tag in a second size or a second color if a first relevance between the first clip and the third clip is larger than a second relevance between the second clip and the third clip, and displaying the first candidate tag in the second size or the second color and the second candidate tag in the first size or the first color if the first relevance is not larger than the second relevance, the first candidate tag is same as the first tag, and the second candidate tag is same as the second tag.

5. The method of claim 4 wherein determining the first candidate tag and the second candidate tag comprises determining the first candidate tag and the second candidate tag by using one or more keywords corresponding to the first clip, one or more keywords corresponding to the second clip and one or more keywords corresponding to the third clip.

6. The method of claim 4, further comprising storing third clip data comprising the third clip, the first candidate tag and the second candidate tag, if the first candidate tag and the second candidate tag are not selected.

7. A computer-readable, non-transitory storage medium having stored thereon a program which is executable by a computer, the program controlling the computer to execute functions of:
   storing first clip data comprising a first clip and a first tag, and second clip data comprising a second clip and a second tag, in a memory wherein the first clip is a part of a first document, the first tag is associated with the first clip, the second clip is a part of a second document, and the second tag is associated with the second clip
   displaying a third document on a screen of a display;
   receiving a selection of a part of the third document as a third clip according to a user operation;
   determining a first candidate tag and a second candidate tag associated with the third clip; displaying the first candidate tag in a first form and the second candidate tag in a second form different from the first form on the screen, if the first candidate tag is same as the first tag or the second tag and if the second candidate tag is not same as the first tag and the second tag wherein the first candidate tag and the second candidate tag have different sizes or colors;
   storing third clip data comprising the third clip and the first candidate tag, if the first candidate tag is selected; and
   storing third clip data comprising the third clip and the second candidate tag, if the second candidate tag is selected;
   wherein displaying the first candidate tag and the second candidate tag comprises displaying the first candidate tag in a first size or a first color and the second candidate tag in a second size or a second color if a first relevance between the first clip and the third clip is larger than a second relevance between the second clip and the third clip, and displaying the first candidate tag in the second size or the second color and the second candidate tag in the first size or the first color if the first relevance is not larger than the second relevance, the first candidate tag is same as the first tag, and the second candidate tag is same as the second tag.

8. The storage medium of claim 7 wherein determining the first candidate tag and the second candidate tag comprises determining the first candidate tag and the second candidate tag by using one or more keywords corresponding to the first clip, one or more keywords corresponding to the second clip and one or more keywords corresponding to the third clip.

9. The storage medium of claim 7, wherein the program controlling the computer to further execute functions of storing third clip data comprising the third clip, the first candidate tag and the second candidate tag, if the first candidate tag and the second candidate tag are not selected.

* * * * *